US010710195B2

(12) United States Patent
Yajima (10) Patent No.: US 10,710,195 B2
(45) Date of Patent: Jul. 14, 2020

(54) COOPERATIVE CONTROL METHOD

(71) Applicant: HONDA MOTOR CO., LTD., Tokyo (JP)

(72) Inventor: Shigeo Yajima, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 358 days.

(21) Appl. No.: 15/724,331

(22) Filed: Oct. 4, 2017

(65) Prior Publication Data

US 2018/0099355 A1    Apr. 12, 2018

(30) Foreign Application Priority Data

Oct. 7, 2016   (JP) .................................. 2016-199538

(51) Int. Cl.
| | | |
|---|---|---|
| B23K 26/21 | (2014.01) | |
| B23K 26/08 | (2014.01) | |
| B23K 26/348 | (2014.01) | |
| B23K 26/242 | (2014.01) | |
| B23K 101/38 | (2006.01) | |

(52) U.S. Cl.
CPC .......... *B23K 26/21* (2015.10); *B23K 26/0869* (2013.01); *B23K 26/242* (2015.10); *B23K 26/348* (2015.10); *B23K 2101/38* (2018.08)

(58) Field of Classification Search
CPC .... B23K 26/21; B23K 26/242; B23K 26/348; B23K 26/0869; B23K 2101/38
See application file for complete search history.

(56) References Cited

U.S. PATENT DOCUMENTS

2016/0185360 A1* 6/2016 Jalla ....................... B61C 17/00
307/9.1

FOREIGN PATENT DOCUMENTS

| CN | 102213055 A | 10/2011 |
|---|---|---|
| CN | 105730238 A | 7/2016 |
| JP | 09-076057 | 3/1997 |
| JP | 2000-090057 | 3/2000 |
| JP | 2005-212549 | 8/2005 |
| JP | 2014-208354 | 11/2014 |
| JP | 2015-182173 | 10/2015 |

OTHER PUBLICATIONS

Chinese Office Action dated Oct. 9, 2019, 7 pages.
Japanese Office Action dated Feb. 27, 2018, 5 pages.

* cited by examiner

*Primary Examiner* — Brian W Jennison
(74) *Attorney, Agent, or Firm* — Rankin, Hill & Clark LLP (57) ABSTRACT

When a first sub-controller (14) and a second sub-controller (15) complete preparation for control, a preparation completion signal is sent to a main controller (13). When receiving the preparation completion signal from each of the first and the second sub-controllers (14)(15), the main controller (13) sends a BusyON signal to the first sub-controller (14) and the second sub-controller (15), and then drives a laser source (16) to generate laser light L. Then the main controller (13) sends a BusyOFF signal to the first and the second sub-controllers (14)(15). When the first sub-controller (14) receives the BusyON signal and then receives the BusyOFF signal, the first sub-controller drives a laser-light irradiation unit (17). When the second sub-controller (15) receives the BusyON signal and then receives the BusyOFF signal, the second sub-controller drives a moving mechanism (12).

3 Claims, 6 Drawing Sheets

COOPERATIVE CONTROL METHOD

BACKGROUND OF THE INVENTION

Field of the Invention

The present invention relates to a cooperative control method for controlling a plurality of control targets in a cooperative manner.

Description of the Related Art

Recently a system configured to control a plurality of control targets with one controller has been commonly used. When one controller controls a plurality of control targets, it is preferable that each control target is controlled in a cooperative manner, and various proposals have been made for such cooperative control.

Patent Document 1 (Japanese Patent Application Laid-Open No. 2000-090057) describes a group object and a control system. According to this document, a plurality of devices to be controlled in a cooperative manner are grouped, and a group object is provided to manage each device making up the group.

However, the group object and the control system described in Patent Document 1 requires to provide a group object to manage a plurality of grouped devices for cooperative control, and so the system may be complicated.

SUMMARY OF THE INVENTION

In view of such circumstances, the present invention aims to provide a cooperative control method capable of easily controlling a plurality of control targets in a cooperative manner.

A cooperative control method according to the present invention is to control a controller. The controller includes: a main controller configured to control a main control target; a first sub-controller configured to control a first sub-control target; and a second sub-controller configured to control a second sub-control target. When preparation for control is completed, the first sub-controller and the second sub-controller send a preparation completion signal to the main controller. When the main controller receives the preparation completion signal from each of the first sub-controller and the second sub-controller, the main controller controls the main control target, and after the main controller controls the main control target, the main controller sends a control execution signal to the first sub-controller and the second sub-controller. When the first sub-controller receives the control execution signal, the first sub-controller controls the first sub-control target, and when the second sub-controller receives the control execution signal, the second sub-controller controls the second sub-control target.

According to the present invention, when the first sub-controller and the second sub-controller complete preparation for control, and then receive the control execution signal from the main controller, the first sub-controller and the second sub-controller start to control the first sub-control target the second sub-control target, respectively. Therefore this method can control the first sub-control target and the second sub-control target easily in a cooperative manner also when the time required for preparation for control is different between the first sub-controller and the second sub-controller.

Preferably when the main controller receives the preparation completion signal from each of the first sub-controller and the second sub-controller, the main controller sends a control hold signal to the first sub-controller and the second sub-controller. After the main controller sends the control hold signal, the main controller controls the main control target. When the first sub-controller receives the control hold signal and then receives the control execution signal, the first sub-controller controls the first sub-control target, and when the second sub-controller receives the control hold signal and then receives the control execution signal, the second sub-controller controls the second sub-control target.

With this configuration, the first sub-control target and the second sub-control target can be controlled in a cooperative manner more reliably. For instance, in the case where the processing time by the first sub-controller or the second sub-controller is shorter than the processing time by the main controller, there are cases where the execution signal from the main controller is continuously detected. In such case, the first sub-controller or the second sub-controller may determine that an execution transmitted after the hold signal has been detected, and may control its sub-control target erroneously repeatedly. With this configuration, each sub-controller controls the control target in a case of receiving the control hold signal and then receiving the control execution signal, thereby enabling to control in a cooperative manner reliably.

Preferably, the second sub-controller takes time to complete preparation for control longer than the first sub-controller, and the controller includes a plurality of the second sub-controllers, and the plurality of second sub-controllers send the preparation completion signal to the main controller one by one, and during control of the second control target by any one of the plurality of second sub-controllers, a next second sub-controller starts preparation for control.

With this configuration, even when the controller includes a plurality of second sub-controllers, a plurality of control targets can be controlled in a cooperative manner. This configuration allows, during the control of the second sub-control target by the current second sub-controller, the next second sub-controller to start preparation of the control. This enables higher-speed control than the configuration including a single second sub-controller.

According to the present invention, a plurality of control targets can be easily controlled in a cooperative manner.

DESCRIPTION OF THE PREFERRED EMBODIMENTS

The following describes an embodiment of the present invention, with reference to the drawings.

The present embodiment relates to arc welding, in which arc is induced by laser irradiation.

To begin with, the following describes one example of the structure of a rotating electrical machine to be welded.

Figure 1:
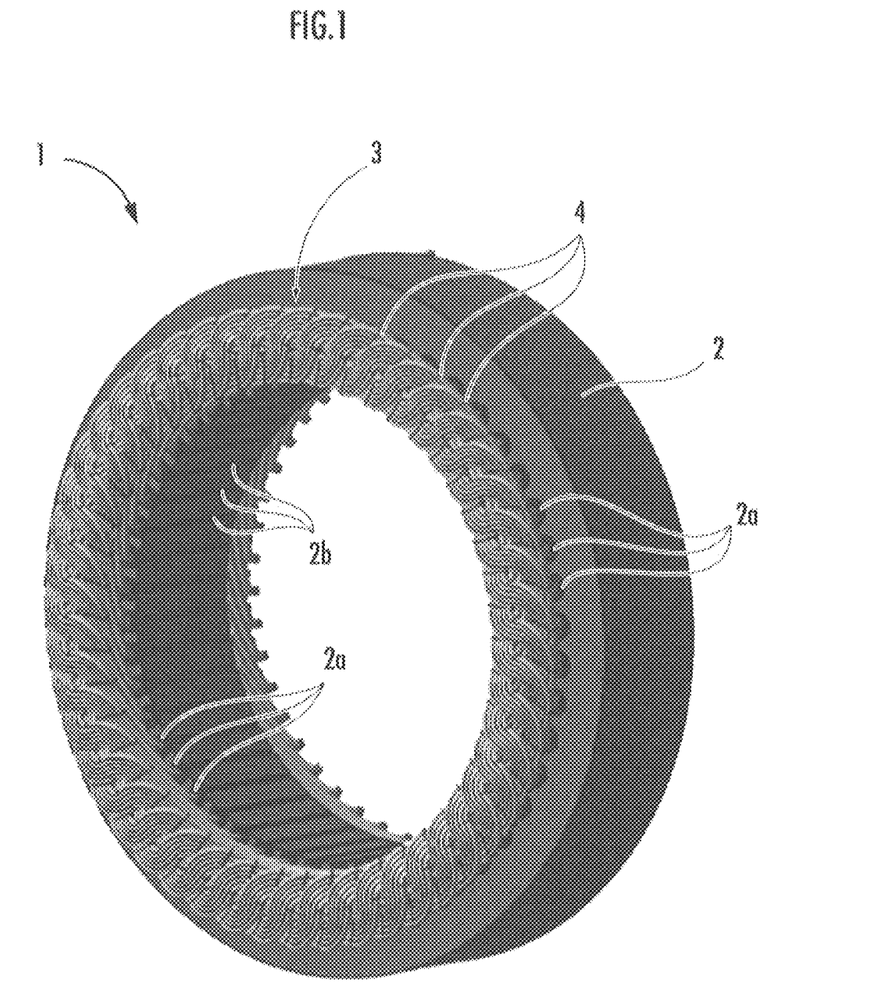
FIG. 1 is a perspective view of a stator of a rotating electrical machine welded by a welding apparatus of the present invention.

As shown in FIG. 1, a rotating electrical machine, such as an electrical motor or an electrical generator, includes a cylindrical stator 1 and a rotor (not illustrated) that is rotatably disposed inside of the stator 1.

The stator 1 includes a stator core 2 and a coil 3. The stator core 2 has a cylindrical shape, and has a plurality of slots 2a that penetrates the stator core in the direction of the rotary axis. The slots are disposed in the stator core circumferentially to have spaces therebetween. Each slot 2a has a cross section in the radial direction of the stator core 2 that extends radially outward from the inner circumference of the stator core 2. Each slots 2a communicate with the inner peripheral face of the stator core 2 via a corresponding slit 2b formed in the stator core 2. The slits 2b may be omitted.

Figure 2:
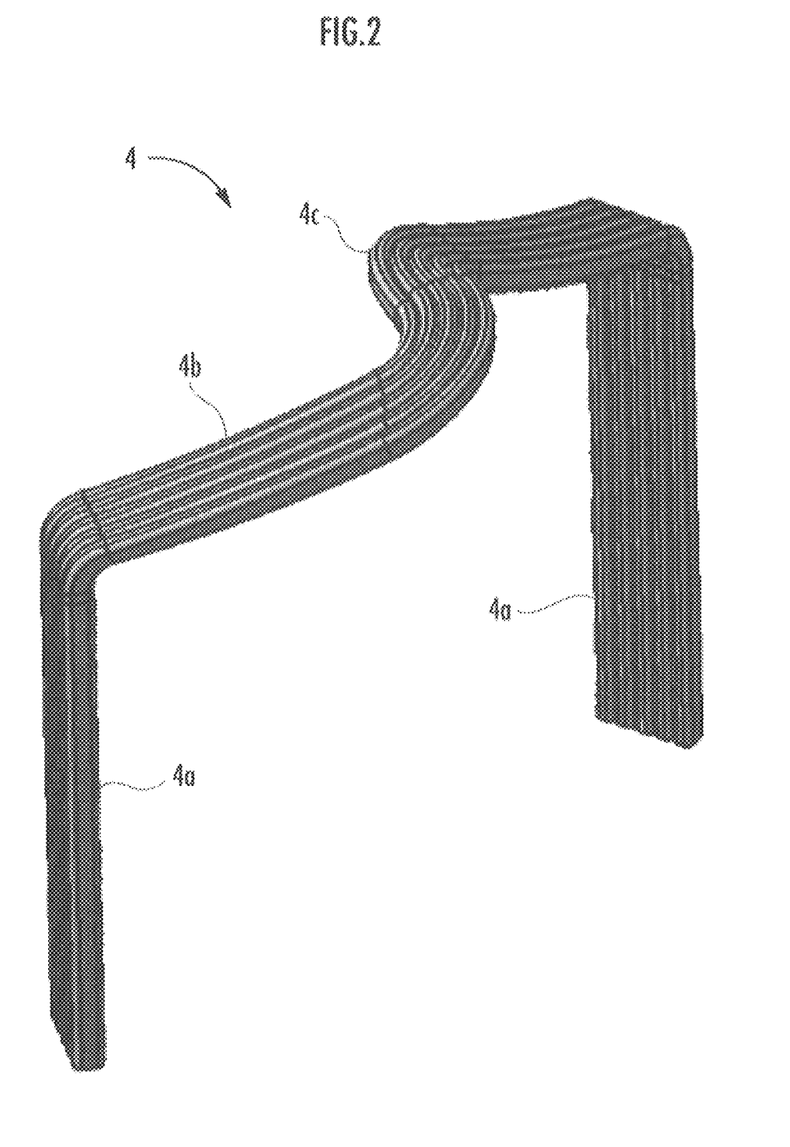
FIG. 2 is a perspective view of a coil segment.

The coil 3 is prepared by inserting a coil segment 4 shown in FIG. 2 into one end of the slot 2a, and then twisting the portion of the coil segment projecting from the other end of the slot 2a in the circumferential direction, followed by welding.

The coil segment 4 includes a plurality of, four in the present embodiment, conductors (conducting wires as rectangular wires), each having a rectangular shape in cross section. The coil segment is prepared by aligning these wires so that their wider faces are opposed to each other, binding these wires into one bundle, and shaping them into a U shape. The coil segment 4 includes a pair of legs 4a, 4a and a head 4b joining the legs 4a and 4a at their one ends (upper ends in the drawing).

The coil segment 4 may have another configuration as long as a plurality of rectangular wires is aligned in the width direction. For example, a plurality of rectangular wires may be aligned so that their narrower faces are opposed to each other.

At the center of the head 4b, the coil segment has an S shaped portion 4c that curves in an S shape in the alignment direction of the rectangular wires. The head 4b has a downward slope toward the legs 4a and 4a from the center (the center of the S shaped portion 4c). A leg 4a of the coil segment 4 is inserted into the corresponding slot 2a from one end. The leg 4a of the coil segment 4 then projects from the other end of the slot 2a.

Figure 3A:
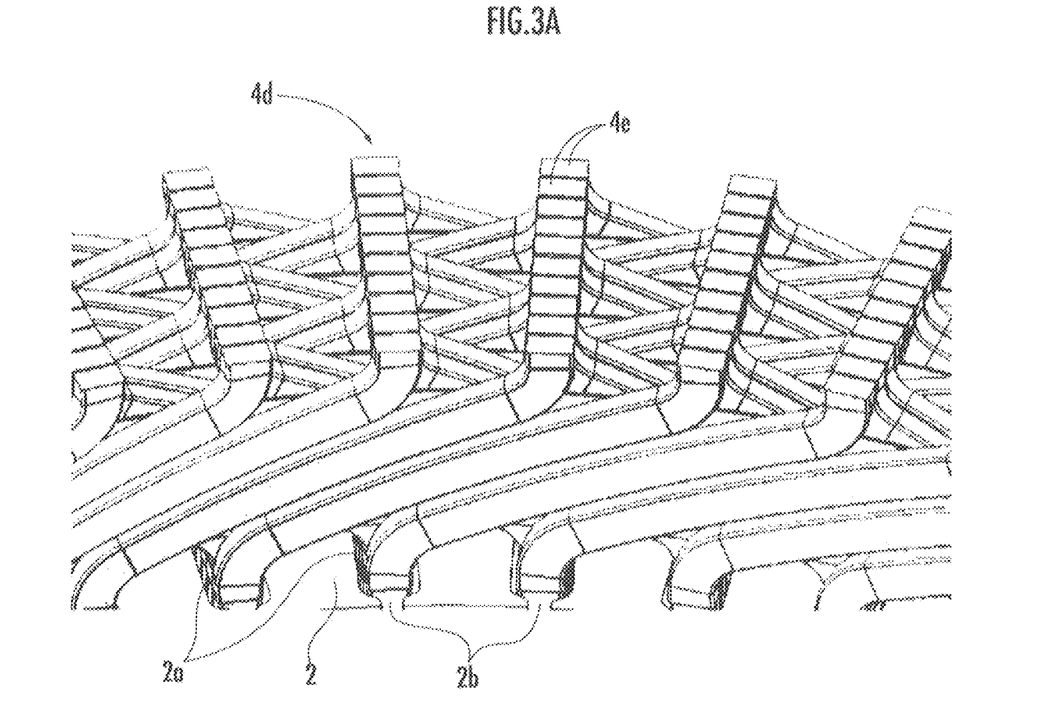
FIG. 3A is a perspective view of a projecting portion of a U-phase coil, a V-phase coil, and a W-phase coil of the coil segment.

As shown in FIG. 3A, the projecting portion 4d of the leg 4a projecting from the other end of the slot 2a is twisted by a twister (not illustrated) in the circumferential direction of the stator 1. The tip ends 4e of the adjacent portions 4d are welded together by a TIG welding apparatus 10 (see FIG. 4) as described later in details. In this way, the stator 1 can be prepared, which has eight-layers of the coil segments 4 that are stacked in the radial direction. In this example, a first layer, a second layer . . . an eighth layer are disposed in this order from the outside to the inside in the radial direction.

Figure 3B:
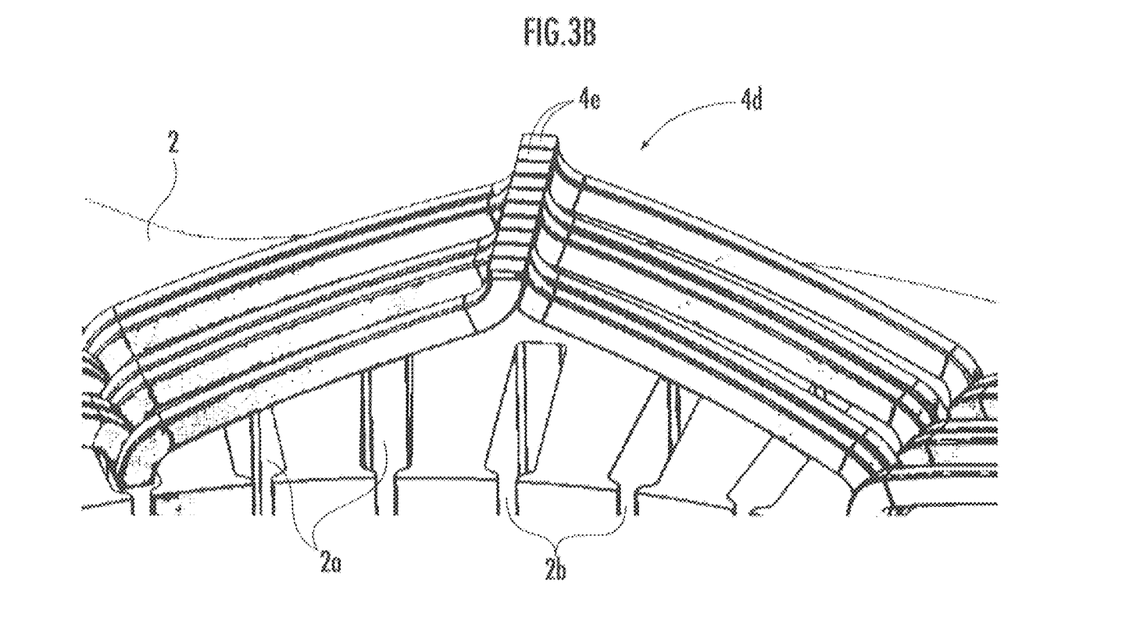
FIG. 3B is a perspective view of a projecting portion of a U-phase coil of the coil segment.

The coil 3 of the present embodiment is a three-phase coil having a U-phase, a V-phase and a W-phase. The legs 4a of the coil segments 4 inserted into the slots 2a are arranged in the order of U-phase, U-phase, V-phase, V-phase, W-phase and W-phase in the circumferential direction. FIG. 3B shows a coil for one phase only (e.g., U-phase coil) of the three phases.

Next, the following describes a welding apparatus 10 to weld the tip ends 4e of the two coil segments 4.

Figure 4:
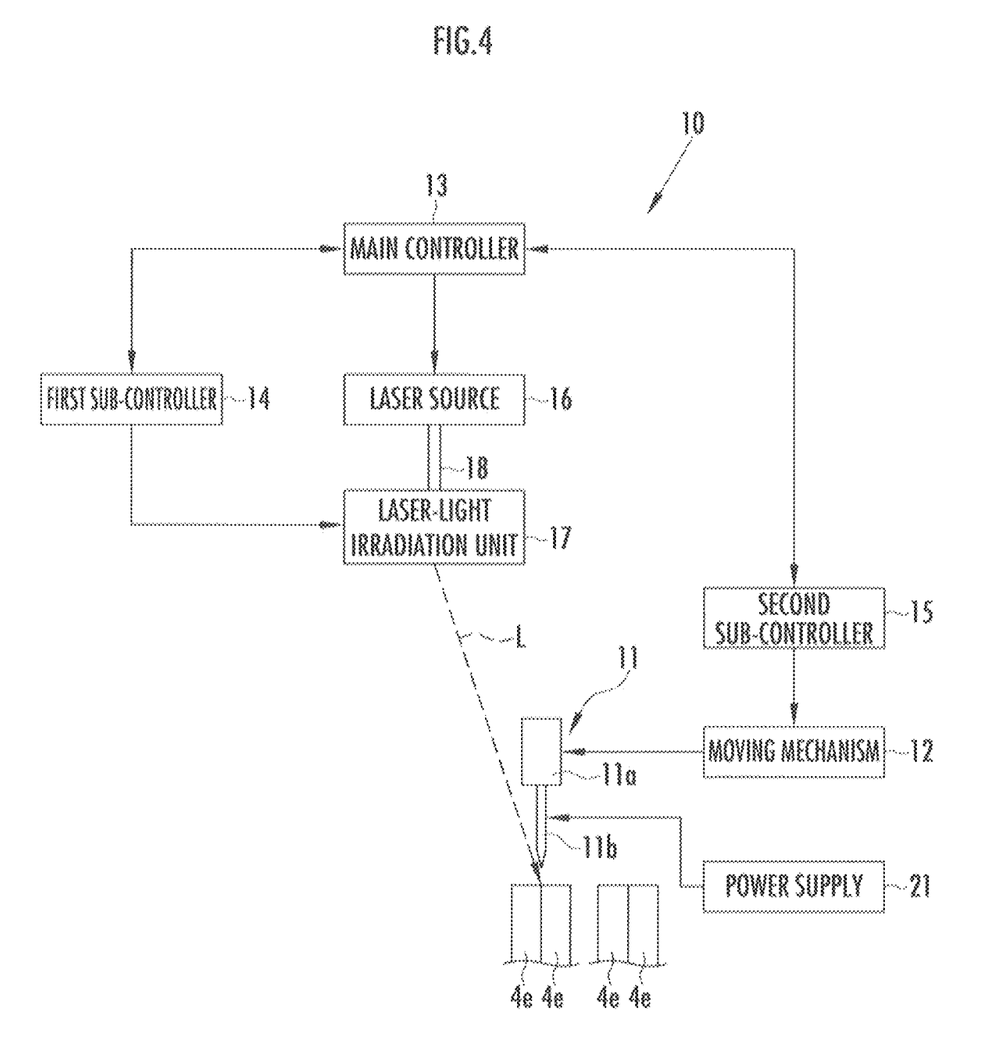
FIG. 4 schematically shows a welding apparatus.

As shown in FIG. 4, the welding apparatus 10 includes a welding torch 11, a moving mechanism 12, a main controller 13, a first sub-controller 14, and a second sub-controller 15.

The welding apparatus 10 further includes a laser source 16 to generate laser light L, a laser-light irradiation unit 17 to selectively irradiate a portion to be welded with the laser light L generated by the laser source 16, and a transmission fiber 18 that connects the laser source 16 and the laser-light irradiation unit 17. The welding apparatus 10 is configured to weld the tip ends 4e of the two adjacent coil segments 4.

The welding torch 11 is to generate arc discharge. The welding torch includes a torch nozzle 11a and a torch electrode 11b attached to the tip end of the torch nozzle 11a. The moving mechanism 12 includes a plurality of arms and a motor, and is configured to drive the arms by the motor so as to move the welding torch 11.

The torch electrode 11b and the stator core 2 are electrically connected to a power supply 21. The power supply 21 is a DC power supply to supply electricity, where the torch electrode 11b is a negative electrode and the coil segment 4 is a positive electrode.

The main controller 13 controls the output from the laser source 16, and the first sub-controller 14 and the second sub-controller 15 are connected to the main controller.

The first sub-controller 14 controls the laser-light irradiation unit 17 to switch the optical path of laser. The second sub-controller 15 controls the moving mechanism 12 to move the welding torch. Each of the first sub-controller 14 and the second sub-controller 15 includes a PLC (programmable logic controller), for example.

The laser source 16 used may be of a type capable of generating YAG laser, semiconductor laser, fiber laser or the like. The laser source 16 is connected to the laser-light irradiation unit 17 via the transmission fiber 18, so that laser light L generated by the laser source 16 is guided to the laser-light irradiation unit 17 through the transmission fiber 18. The laser-light irradiation unit 17 includes an optical system, including a mirror and a lens. The laser-light irradiation unit is to collect the laser light L transmitted through the transmission fiber 18 at a desired portion.

Figure 5:
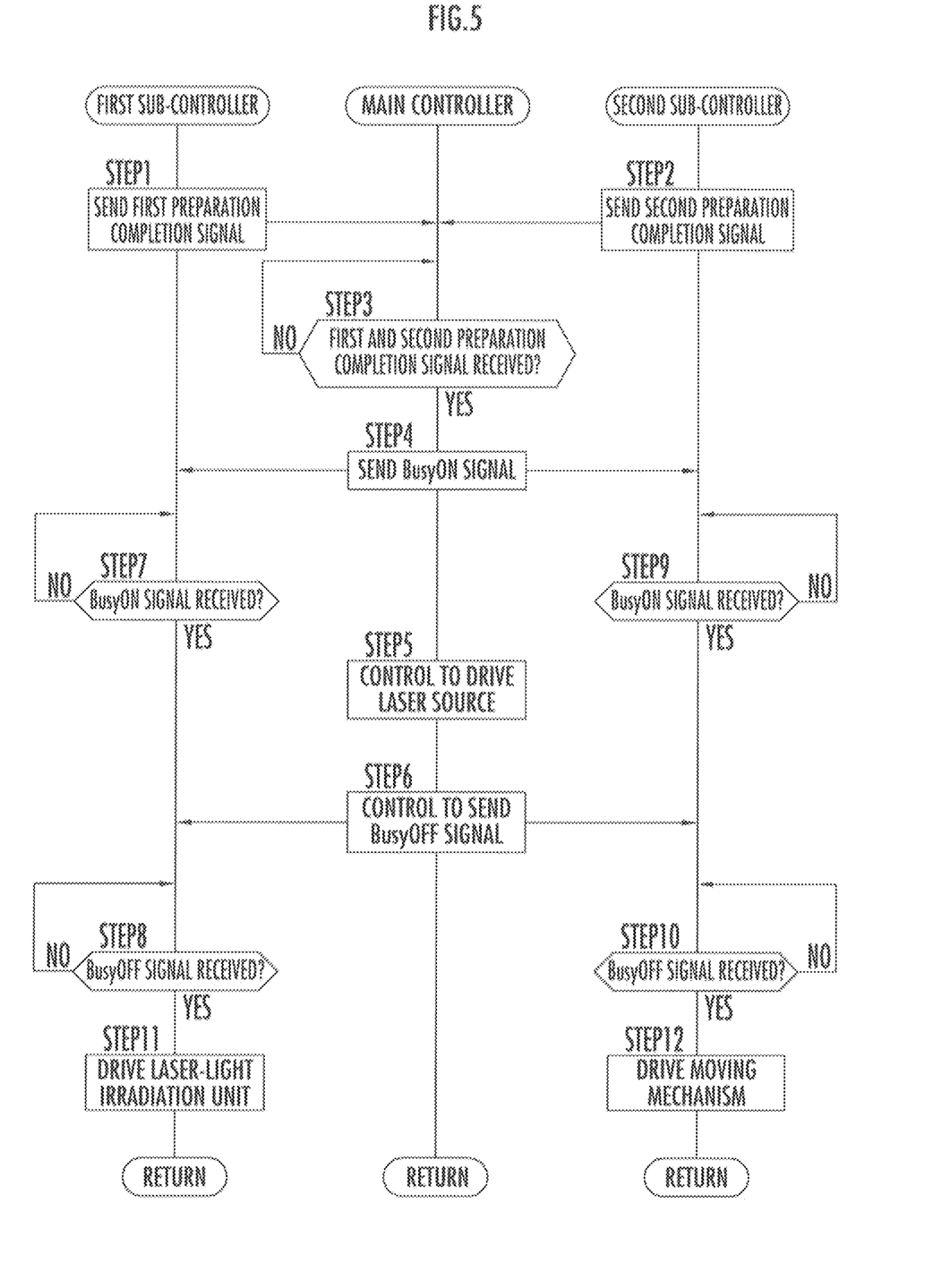
FIG. 5 is a flowchart showing the control flow for welding.

Referring next to the flowchart of FIG. 5, the following describes a cooperative control method when welding is performed using the welding apparatus 10. At the start of welding, the power supply 21 supplies electricity so that the torch electrode 11b is the negative electrode and the two coil segments 4 are the positive electrode. The laser light L transmitted from the laser source 16 to the laser-light irradiation unit 17 via the transmission fiber 18 is collected toward the tip ends 4e of the two coil segments 4 on the left of FIG. 4. The torch electrode 11b of the welding torch 11 is located between the tip ends 4e of the two coil segments 4 on the left of FIG. 4.

As shown in FIG. 5, the first sub-controller 14 creates control information so as to shift the optical path of the laser from the laser-light irradiation unit 17 from the state where the laser light L is collected toward the tip ends 4e of the two coil segments 4 on the left of FIG. 4 to the state where the laser light L is collected toward the tip ends 4e of the two coil segments 4 on the right of FIG. 4. After such control information is created, the first sub-controller 14 sends a first preparation completion signal to the main controller 13 (STEP 1).

The second sub-controller 15 creates control information so as to control the moving mechanism 12 so that the torch electrode 11b of the welding torch 11 is moved from the position between the tip ends 4e of the two coil segments 4 on the left of FIG. 4 to the position between the tip ends 4e of the two coil segments 4 on the right of FIG. 4. After such control information for controlling the moving mechanism 12 is created, the second sub-controller 15 sends a second preparation completion signal to the main controller 13 (STEP 2). In the present embodiment, the time required for preparation for control by the second sub-controller 15 is longer than the time required for preparation for control by the first sub-controller 14.

The main controller 13 detects whether the first and the second preparation completion signals are received or not from the first sub-controller 14 and the second sub-controller 15, respectively (STEP 3). When the main controller 13 detects the reception of both of the first and second preparation completion signals controls ("YES" at STEP 3), the main controller sends a BusyON signal (control hold signal) to the first sub-controller 14 and the second sub-controller 15 (STEP 4). Then, the main controller 13 controls the driving of the laser source 16 (STEP 5).

At STEP 5, the main controller 13 drives the laser source 16 so as to let the laser source 16 generate laser light L. The laser-light irradiation unit 17 collects the laser light L toward the tip ends 4e of the two coil segments 4 on the left of FIG. 4. At STEP 5, when condition for arc discharge due to the laser irradiated becomes ready, the main controller 13 stops the laser output from the laser source 16. The condition for arc discharge becomes ready means that the laser is irradiated for a predetermined time duration, for example. When the main controller 13 does not detect the reception of both of the first and second preparation completion signals ("NO" at STEP 3), the main controller repeats STEP 3.

After stopping the laser output from the laser source 16 (STEP 5), the main controller 13 sends a BusyOFF signal (control execution signal) to the first sub-controller 14 (STEP 6). At Step 6, after arc welding ends (e.g., arc welding is performed for predetermined time duration), the main controller 13 sends a BusyOFF signal (control execution signal) to the second sub-controller 15.

Figure 6:
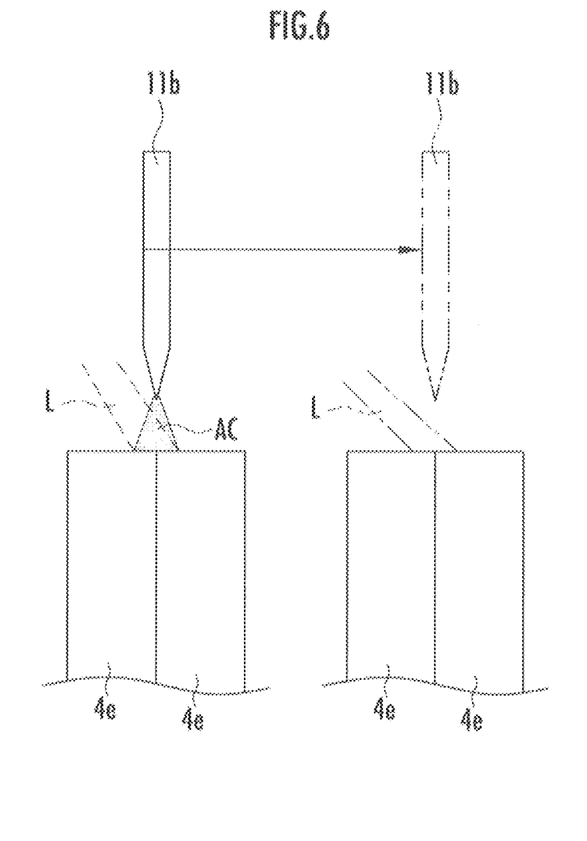
FIG. 6 is a lateral view showing a state in which the arc is generated between the tip ends of the two coil segments and the torch electrode.

As shown in FIG. 6, while setting the torch electrode 11b of the welding torch 11 between the tip ends 4e of the two coil segments 4 on the left, the laser-light irradiation unit 17 collects the laser light L generated toward the tip ends 4e of the two coil segments 4 on the left.

Since the electricity is supplied so that the torch electrode 11b is the negative electrode and the two coil segments 4 are the positive electrode, a space between the tip ends 4e of the two coil segments 4 and the torch electrode 11b can be an ionized plasma state due to the laser light L. As a result, the resistance value in this space rapidly decreases, so that arc discharge AC is induced from the torch electrode 11b at the part irradiated with the laser light L, whereby the tip ends 4e of the two coil segments 4 are welded together. In the present embodiment, the laser light L is to induce arc discharge AC. Once the arc discharge AC is generated, arc welding can be performed without irradiating with the laser light L.

During welding, an argon-gas supplying means (not illustrated) is activated to shield the welding point and the welding torch 11 with argon gas.

After sending the preparation completion signal to the main controller 13 (STEP 1), the first sub-controller 14 detects whether a BusyON signal is received or not (STEP 7). When the first sub-controller 14 detects the reception of BusyON signal ("YES" at STEP 7), the first sub-controller 14 detects whether a BusyOFF signal is received or not (STEP 8). If the first sub-controller 14 does not detect the reception of BusyON signal ("NO" at STEP 7), the first sub-controller 14 repeats STEP 7.

Similarly, after sending the preparation completion signal to the main controller 13 (STEP 2), the second sub-controller 15 detects whether a BusyON signal is received or not (STEP 9). When the second sub-controller 15 detects the reception of BusyON signal ("YES" at STEP 9), the second sub-controller 15 detects whether a BusyOFF signal is received or not (STEP 10). If the second sub-controller 15 does not detect the reception of BusyON signal ("NO" at STEP 9), the second sub-controller 15 repeats STEP 9. STEP 4, STEP 7 and STEP 9 may be omitted.

As described above, after controlling the laser source 16 to generate laser light (STEP 5), the main controller 13 sends a BusyOFF signal (control execution signal) to the first sub-controller 14, and after arc welding ends, the main controller 13 sends a BusyOFF signal (control execution signal) to the second sub-controller 15 (STEP 6).

The first sub-controller 14 detects whether a BusyOFF signal is received or not (STEP 8). When the first sub-controller 14 detects the reception of a BusyOFF signal ("YES" at STEP 8), the first sub-controller 14 controls the laser-light irradiation unit 17 to switch the optical path of the laser light L from the laser source 16 to the laser-light irradiation unit 17 via the transmission fiber 18 so as to collect the laser light toward the tip ends 4e of the two coil segments 4 on the right of FIG. 4 (STEP 11). If the first sub-controller 14 does not detect the reception of BusyOFF signal ("NO" at STEP 8), the first sub-controller 14 repeats STEP 8.

The second sub-controller 15 detects whether a BusyOFF signal is received or not (STEP 10). When the second sub-controller 15 detects the reception of a BusyOFF signal ("YES" at STEP 10), the second sub-controller 15 controls the moving mechanism 12 so that the torch electrode 11b of the welding torch 11 is located between the tip ends 4e of the two coil segments 4 on the right of FIG. 4 (STEP 12). If the second sub-controller 15 does not detect the reception of BusyOFF signal ("NO" at STEP 10), the second sub-controller 15 repeats STEP 10.

Next, the above STEP 1 to STEP 12 are performed so as to weld the tip ends 4e of the two coil segments 4 on the right of FIG. 6. Such control is performed for the tip ends 4e of all of the coil segments 4, whereby the tip ends 4e of all of the adjacent coil segments 4 can be welded.

If the first sub-controller 14 and the second sub-controller 15 independently determines the timing to start the control at STEP 11 and STEP 12, respectively, as in the prior art, the following may occur. That is, since the control by one of the controllers having a shorter processing time will be started first, cooperative control for STEP 11 by the first sub-controller 14 and STEP 12 by the second sub-controller 15 cannot be performed.

In the present embodiment, when the first sub-controller 14 detects the reception of a BusyOFF signal from the main controller 13 ("YES" at STEP 8), the first sub-controller 14 drives the laser-light irradiation unit 17 (STEP 11). When the second sub-controller 15 detects the reception of a BusyOFF signal from the main controller 13 ("YES" at STEP 10), the second sub-controller 15 drives the moving mechanism 12 (STEP 12). In this way, these controllers start to control in response to the reception of a BusyOFF signal from the main controller 13, and therefore cooperative control for STEP 11 by the first sub-controller 14 and STEP 12 by the second sub-controller 15 can be easily performed.

Further, since the welding apparatus includes the first sub-controller 14 and the second sub-controller 15, control load on each of the first sub-controller 14 and the second sub-controller 15 can be reduced as compared with an apparatus including a single sub controller configured to control the drive of the laser-light irradiation unit 17 and the moving mechanism 12. This enables high-speed control.

A plurality of (e.g., three) second sub-controllers 15 having a longer preparation time for control than the first sub-controller 14 may be provided. When three of the second sub-controllers 15 are provided, these second sub-controllers 15 may be configured so as to send a preparation completion signal to the main controller 13 one by one in order. Then, the first sub-controller 14 may be configured to send a preparation completion signal to the main controller 13 so as to correspond to each of the three second sub-controllers 15. Such a plurality of second sub-controller 15 allows, during the control of the moving mechanism 12 by the current second sub-controller 15, the next second sub-controller 15 in order to start preparation of the control. This enables higher-speed control than the configuration including a single second sub-controller 15.

The welding apparatus may include a plurality of welding torches 11, and the moving mechanism 12 may move the plurality of welding torches 11 at one time. In this case, STEP 1 to STEP 12 are performed for each of the welding torches 11.

The controller to implement the cooperative control method of the present invention is not limited to the welding apparatus 10, and the cooperative control method can be applied to any apparatus configured to control a plurality of sub-control targets.

What is claimed is:

1. A cooperative control method for a controller including: a main controller configured to control a main control target; a first sub-controller configured to control a first sub-control target which can be controlled when a condition for executing a main operation by the main control target is met; and a second sub-controller configured to control a second sub-control target which can be controlled after the main operation is completed, the cooperative control method comprising:

sending a preparation completion signal from each of the first sub-controller and the second sub-controller to the main controller when preparation for control is completed, controlling the main control target using the main controller when the main controller receives the preparation completion signal from each of the first sub-controller and the second sub-controller, and sending a first control execution signal from the main controller to the first sub-controller when the condition for executing the main operation by the main control target is met and, after the main operation is completed, sending a second control execution signal from the main controller to the second sub-controller, controlling the first sub-control target using the first sub-controller when the first sub-controller receives the first control execution signal, and controlling the second sub-control target using the second sub-controller when the second sub-controller receives the second control execution signal.

2. The cooperative control method according to claim 1, further comprising:

sending a control hold signal from the main controller to the first sub-controller and the second sub-controller when the main controller receives the preparation completion signal from each of the first sub-controller and the second sub-controller, and after sending the control hold signal from the main controller, controlling the main control target using the main controller, controlling the first sub-control target using the first sub-controller when the first sub-controller receives the control hold signal and then receives the control execution signal, and controlling the second sub-control target using the second sub-controller when the second sub-controller receives the control hold signal and then receives the control execution signal.

3. The cooperative control method according to claim 1, wherein a plurality of the second sub-controllers are provided, and after the main operation is completed the cooperative control method comprises sending the second control execution signal from the main controller to each of the plurality of the second sub-controllers in order.

* * * * *